April 4, 1950  W. G. GORDON  2,502,943
COMBINATION HEDGE TRIMMER AND LAWN MOWER
Filed Aug. 7, 1946  4 Sheets-Sheet 2
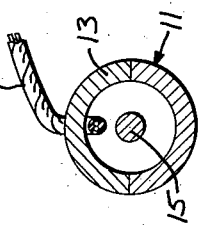
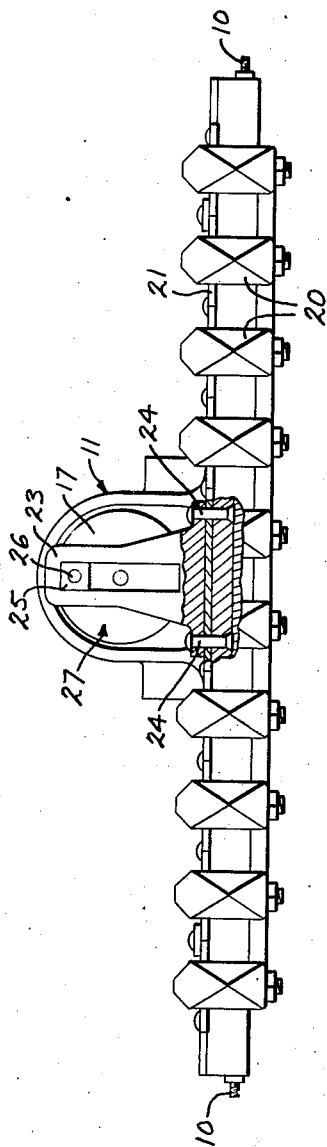
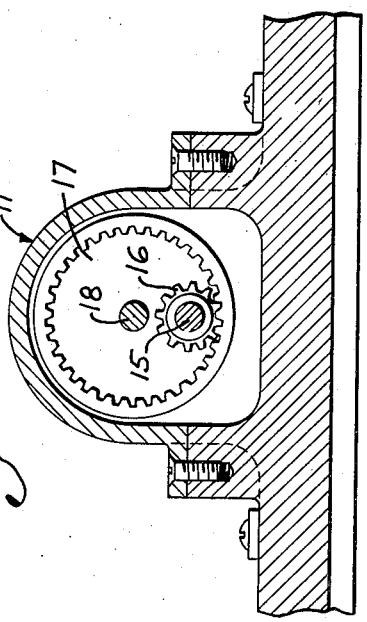
W. G. Gordon
Inventor April 4, 1950        W. G. GORDON        2,502,943
COMBINATION HEDGE TRIMMER AND LAWN MOWER
Filed Aug. 7, 1946        4 Sheets-Sheet 3
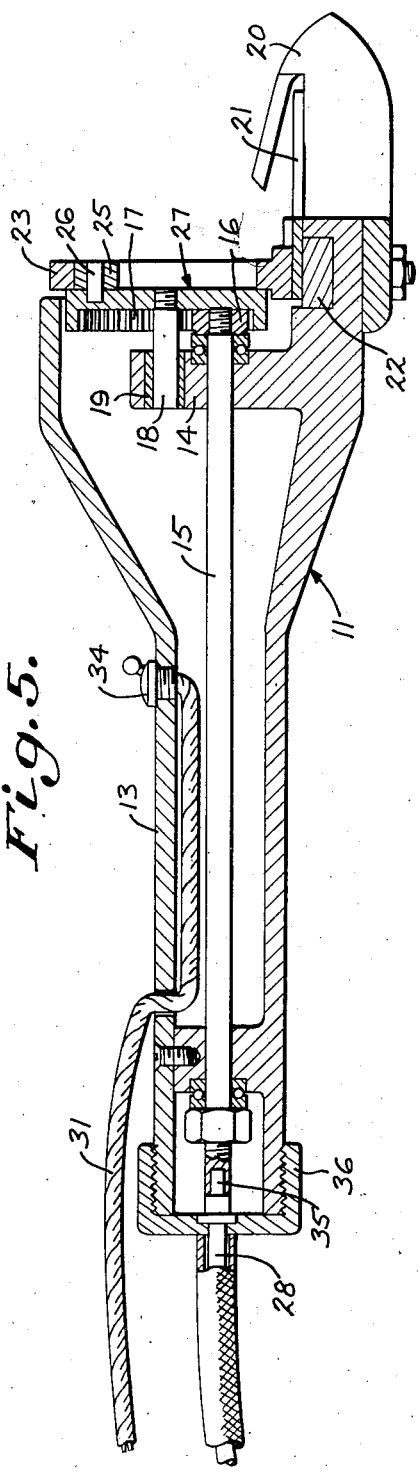
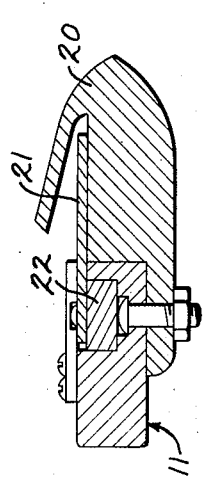
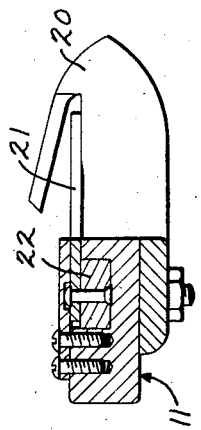
W. G. Gordon
Inventor
By C. A. Snowles.
Attorneys.

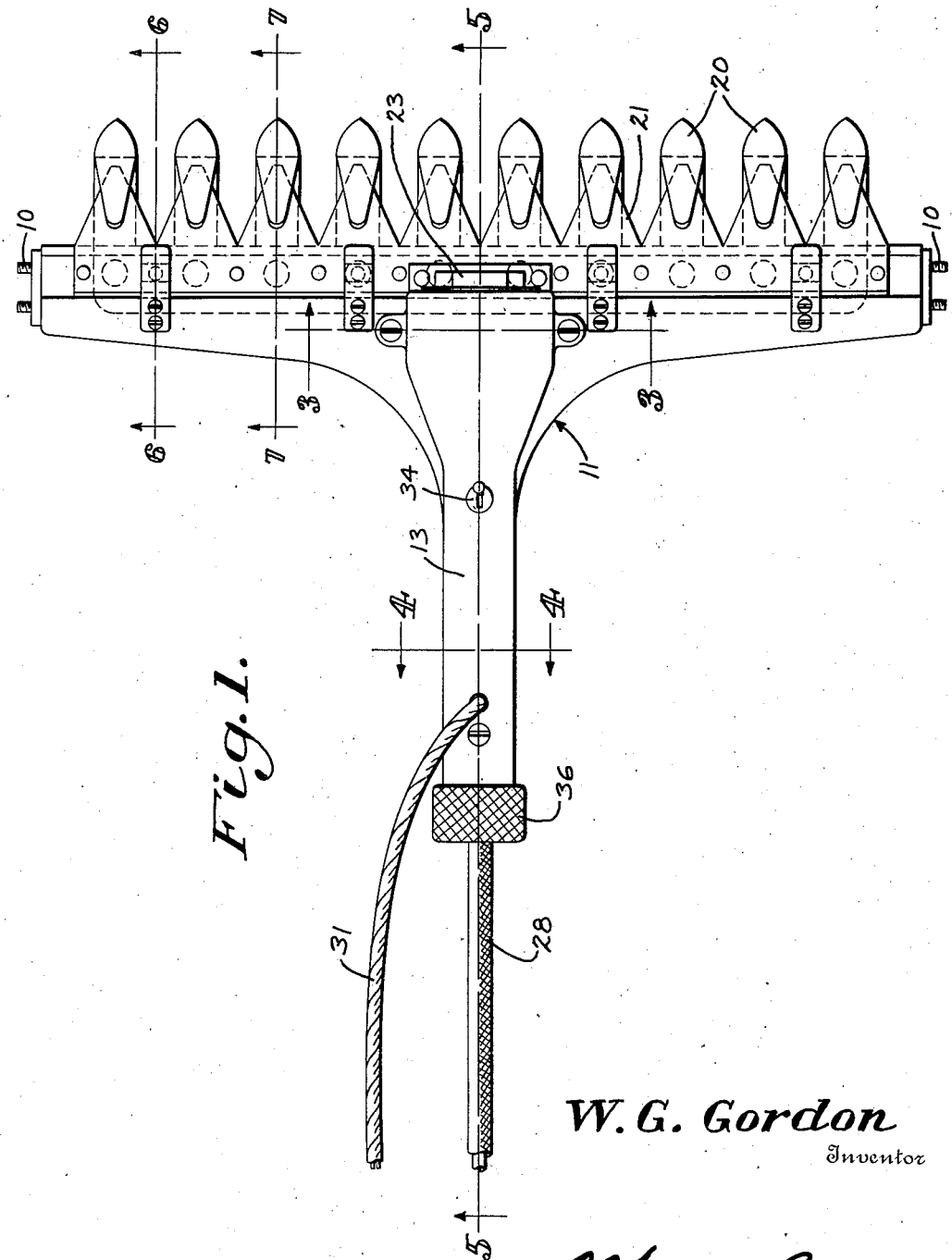

April 4, 1950 W. G. GORDON 2,502,943
COMBINATION HEDGE TRIMMER AND LAWN MOWER
Filed Aug. 7, 1946 4 Sheets-Sheet 4

W. G. Gordon
Inventor

By *C. A. Brown & Co.*
Attorneys.

Patented Apr. 4, 1950

2,502,943

UNITED STATES PATENT OFFICE 2,502,943

COMBINATION HEDGE TRIMMER AND LAWN MOWER

William G. Gordon, San Antonio, Tex.

Application August 7, 1946, Serial No. 689,040

1 Claim. (Cl. 56—26.5)

This invention relates to motor mowers, and more particularly to that type of mowers powered by electric motors.

The primary object of the invention is to provide an electric or gasoline driven mower of this character, including a wheel-supported mower frame, and a cutter head removably connected thereto, whereby the cutter head may be readily and easily disconnected from the mower frame and used as a portable clipper for clipping or trimming hedge or other cultivated bushes.

Still another object of the invention is to provide novel means for converting rotary movement of the drive shaft of the mower, to reciprocatory movement, whereby the movable cutter blades are reciprocated to accomplish the cutting operation.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is an enlarged plan view of the cutter head removed from the frame of the machine, for use as a portable hedge trimmer.

Figure 2 is an enlarged front elevational view of the cutter head.

Figure 3 is an enlarged sectional view taken on line 3—3 of Fig. 1.

Figure 4 is an enlarged sectional view taken on line 4—4 of Fig. 1.

Figure 5 is an enlarged sectional view taken on line 5—5 of Fig. 1.

Figure 6 is an enlarged sectional view taken on line 6—6 of Fig. 1.

Figure 7 is an enlarged sectional view taken on line 7—7 of Fig. 1.

Figure 8:
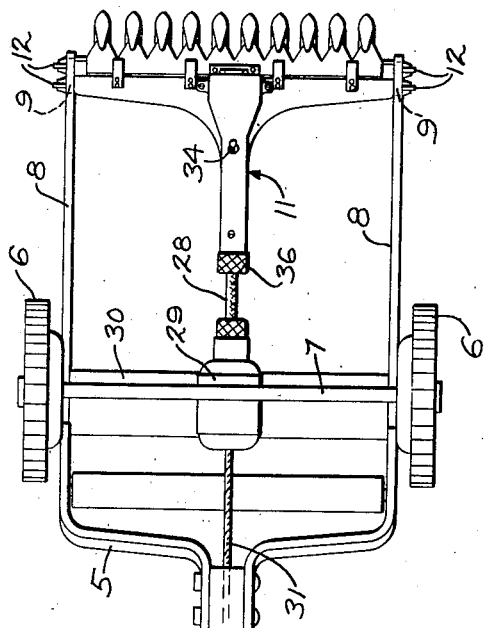
Figure 8 is a plan view of the device when used as a lawn mower.
Figure 9:
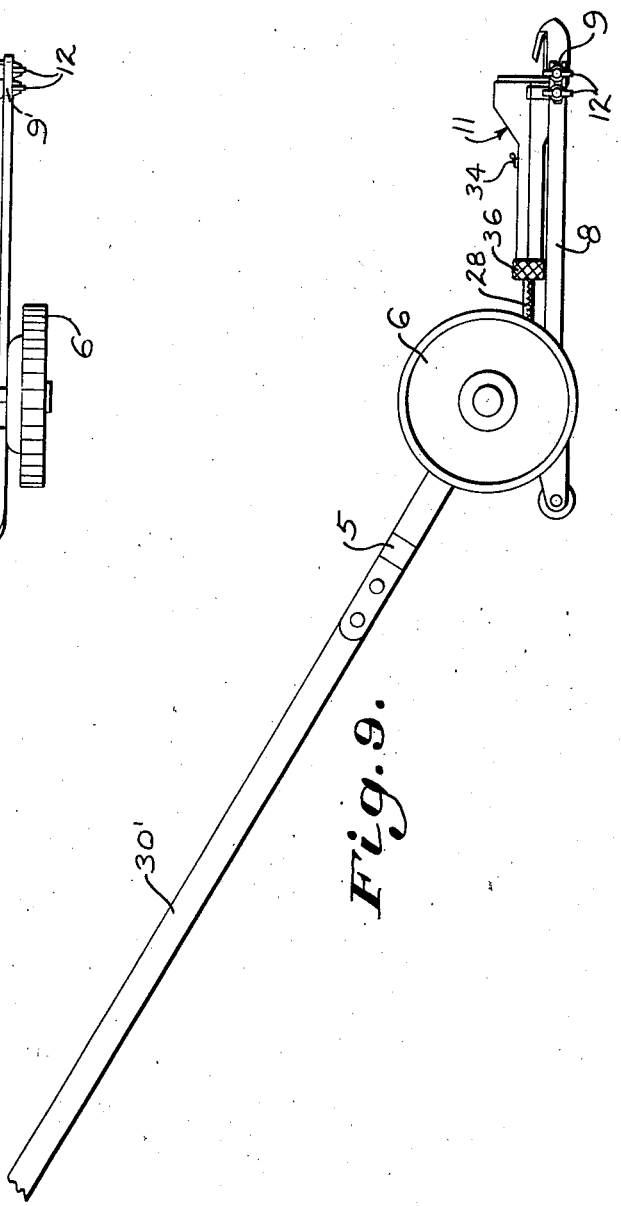
Figure 9 is a side elevational view thereof.

Referring to the drawings in detail, the device comprises a substantially U-shaped frame indicated generally by the reference character 5, the frame being supported by the wheels 6 mounted on the axle 7.

The bars 8 of the mower frame, extend forwardly beyond the wheels 6, appreciable distances, where the forward ends thereof are provided with elongated openings or slots 9 that extend inwardly from the free ends of the bars 8, the openings or slots 9 being designed to receive the bolts 10 that extend from the ends of the cutter head 11, the bolts 10 being arranged in pairs and supplied with winged nuts 12 for securing the cutter head in position.

The cutter head also includes a hollow handle section 13 in which is provided the bearing 14 through which the main or power shaft 15 extends, the forward end of the shaft 15 being supplied with the gear 16 that meshes with the ring gear 17 mounted on the shaft 18 which operates in the bearing 19.

Extending forwardly from the cutter head 11, are the blade guards 20 under which the cutter blades 21 operate, the cutter blades being secured to the reciprocating cutter bar 22 which moves in a transversely formed groove of the cutter head, as shown by Fig. 5 of the drawings.

The reference character 23 indicates the power bracket which is bolted to the reciprocating cutter bar, by means of the bolts or rivets 24, the bracket 23 being provided with an elongated opening in which the block 25 operates, the block 25 being secured to the shaft 26 that extends into an opening formed in the face of the disk 27 on which the ring gear 17 is formed. Thus it will be seen that due to this construction, as the ring gear 17 rotates, the block 25 will move longitudinally of the opening formed in the bracket 23, reciprocating the cutter bar 22 to operate the cutter blades 21. The power shaft 15 is connected with the flexible shaft 28 that connects with the electric motor 29 mounted on the bar 30 of the motor frame. It will of course be understood that any well known means may be provided for lengthening or shortening this flexible shaft, so that when the device is used as a hand or portable hedge trimmer, the electric, or gasoline motor 29 may be used to power the reciprocating blades of the cutter head.

The handle by means of which the mower is controlled, is indicated by the reference character 30', the handle being hollow providing a housing for the electric wire 31 which leads to a suitable source of electricity supply not shown. A switch indicated at 32 is mounted in the circuit and is disposed adjacent to the cross-bar 33 of the handle where it will be readily accessible to the operator.

This circuit wire also leads into the hollow handle of the cutter head, where it is further supplied with an electric switch 34 to permit the current to be controlled by the hand of the operator in using the cutter head as a portable hedge trimmer.

As clearly shown by Fig. 5 of the drawings, the power shaft 15 is provided with a socket in one end thereof, the socket being square to accommodate the square shaft 35 of the flexible shaft 28, the shaft 28 being held in position by means of the collar 36 which is removably mounted on one end of the hollow handle section 13.

From the foregoing it will be seen that due to the construction shown and described, the device may be used as an electrically or gasoline powered motor for cutting grass or lawns, and that by removing the winged nuts 12 and disconnecting the cutter head from the U-shaped frame, the cutter head may be used as a portable hedge trimmer.

What is claimed is:

A combined lawn mower and hedge trimmer, comprising a wheel-supported frame, a motor mounted on the frame, a cutter head including a cutter, removably mounted on the mower frame and including a single centrally disposed hollow handle extended rearwardly from the cutter whereby the cutter head may be operated as a portable trimmer independently of the frame, a shaft extending through the handle for transmitting motion from the motor to the cutter of the cutter head, and flexible drive means detachably coupled at opposite ends to the motor and shaft respectively.

WILLIAM G. GORDON.

REFERENCES CITED

The following references are of record in the file of this patent:

UNITED STATES PATENTS

| Number | Name | Date |
| --- | --- | --- |
| 1,660,764 | Pidlisny | Feb. 28, 1928 |
| 1,814,649 | Wade | July 14, 1931 |
| 1,902,114 | Beanblossom | Mar. 21, 1933 |